(12) United States Patent
Hopkins

(10) Patent No.: US 12,188,725 B2
(45) Date of Patent: Jan. 7, 2025

(54) TRANSFER-OF-MASS SYSTEM AND METHOD FOR INCREASING ROTATIONAL ENERGY OUTPUT

(71) Applicant: Lester Reid Hopkins, Eastville, VA (US)

(72) Inventor: Lester Reid Hopkins, Eastville, VA (US)

( * ) Notice: Subject to any disclaimer, the term of this patent is extended or adjusted under 35 U.S.C. 154(b) by 581 days.

(21) Appl. No.: 17/539,484

(22) Filed: Dec. 1, 2021

(65) Prior Publication Data

US 2022/0178622 A1    Jun. 9, 2022

Related U.S. Application Data

(60) Provisional application No. 63/122,183, filed on Dec. 7, 2020.

(51) Int. Cl.
| | |
|---|---|
| *F28D 15/02* | (2006.01) |
| *F03G 3/00* | (2006.01) |
| *F28D 15/06* | (2006.01) |
| *F28D 21/00* | (2006.01) |

(52) U.S. Cl.
CPC ......... *F28D 15/0208* (2013.01); *F03G 3/094* (2021.08); *F28D 15/06* (2013.01); *F28D 2021/004* (2013.01)

(58) Field of Classification Search
CPC .............. F28D 15/06; F28D 2021/004; F28D 15/0208; F03G 3/094
See application file for complete search history.

(56) References Cited

U.S. PATENT DOCUMENTS 3,991,575 A * 11/1976 Bailey ................... F01K 27/005
122/11

* cited by examiner

*Primary Examiner* — Abiy Teka
(74) *Attorney, Agent, or Firm* — Peter J. Van Bergen

(57) ABSTRACT

A transfer-of-mass system for increasing rotational energy output thereof includes a sealed container having a central axis and an outer wall radially spaced apart from the central axis. A liquid partially fills the container. A motor causes the container to rotate about its central axis at a speed of rotation such that the liquid is acted upon by centrifugal forces to move it to the container's outer wall. Energy is applied to the liquid to cause at least a portion of the liquid at the container's outer wall to move towards the container's central axis wherein the container rotates faster than the speed of rotation caused by the motor.

15 Claims, 4 Drawing Sheets

US 12,188,725 B2

TRANSFER-OF-MASS SYSTEM AND METHOD FOR INCREASING ROTATIONAL ENERGY OUTPUT

Pursuant to 35 U.S.C. § 119, the benefit of priority from provisional application 63/122,183, with a filing date of Dec. 7, 2020, is claimed for this non-provisional application.

FIELD OF THE INVENTION

The invention relates generally to rotation-based energy generation, and more particularly to a rotating system using transfer of mass within the rotational portion of the system to increase kinetic energy generated thereby.

BACKGROUND OF THE INVENTION

Rotation-based energy generation systems include conventional heat engines such as the well-known steam engine. A conventional steam engine injects heated vapor (e.g., steam) under high pressure into a turbine to spin the turbine blades. That is, the heat energy that vaporizes liquid into vapor is converted to mechanical energy/rotation that, in turn, can be used to generate electrical energy, generate vehicle power, serve as the prime mover for pumps, etc. Drawbacks of conventional steam engines include energy loss as pressurized steam droplets collide with a turbine's blades and the mechanical pitting/deterioration of turbine blades owing to the continual bombardment with fluid droplets embedded in the vapor. In addition, steam engine designs are complex and require intensive, ongoing maintenance. Furthermore, low-temperature, low-pressure steam engine designs require relatively large-diameter turbines and components.

SUMMARY OF THE INVENTION

Accordingly, it is an object of the present invention to provide a new type of rotation-based energy generation system.

Another object of the present invention is to provide a heat engine that does not require turbine blades.

Still another object of the present invention is to provide an efficient heat engine methodology.

Other objects and advantages of the present invention will become more obvious hereinafter in the specification and drawings.

In accordance with the present invention, a transfer-of-mass system for increasing rotational energy output thereof includes a sealed container having a central axis and an outer wall radially spaced apart from the central axis. A liquid partially fills the sealed container. A motor, coupled to the sealed container, causes the sealed container to rotate about its central axis at a speed of rotation wherein the liquid is acted upon by centrifugal forces to move it to the sealed container's outer wall. Energy is applied to the liquid to cause at least a portion of the liquid at the outer wall of the sealed container to move towards the central axis of the sealed container wherein the sealed container rotates faster than the speed of rotation caused by the motor.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein.

DETAILED DESCRIPTION OF THE INVENTION

The present invention is a system and method for increasing rotational energy of a rotating element. In general, the rotating element is a sealed container that is partially filled with a liquid. The sealed container is rotated about its central axis such that centrifugal forces act on the liquid to drive the liquid to the container's outer walls. Then, energy is applied to the liquid, directly or indirectly via the container, to cause at least a portion of the liquid at the container's outer walls to move towards the container's central axis. This transfer of the liquid's mass towards the central axis of the container causes the container's rotational speed to increase. By way of an illustrative example, the above-described system and method can be used to construct a new type of rotating engine.

Figure 1:
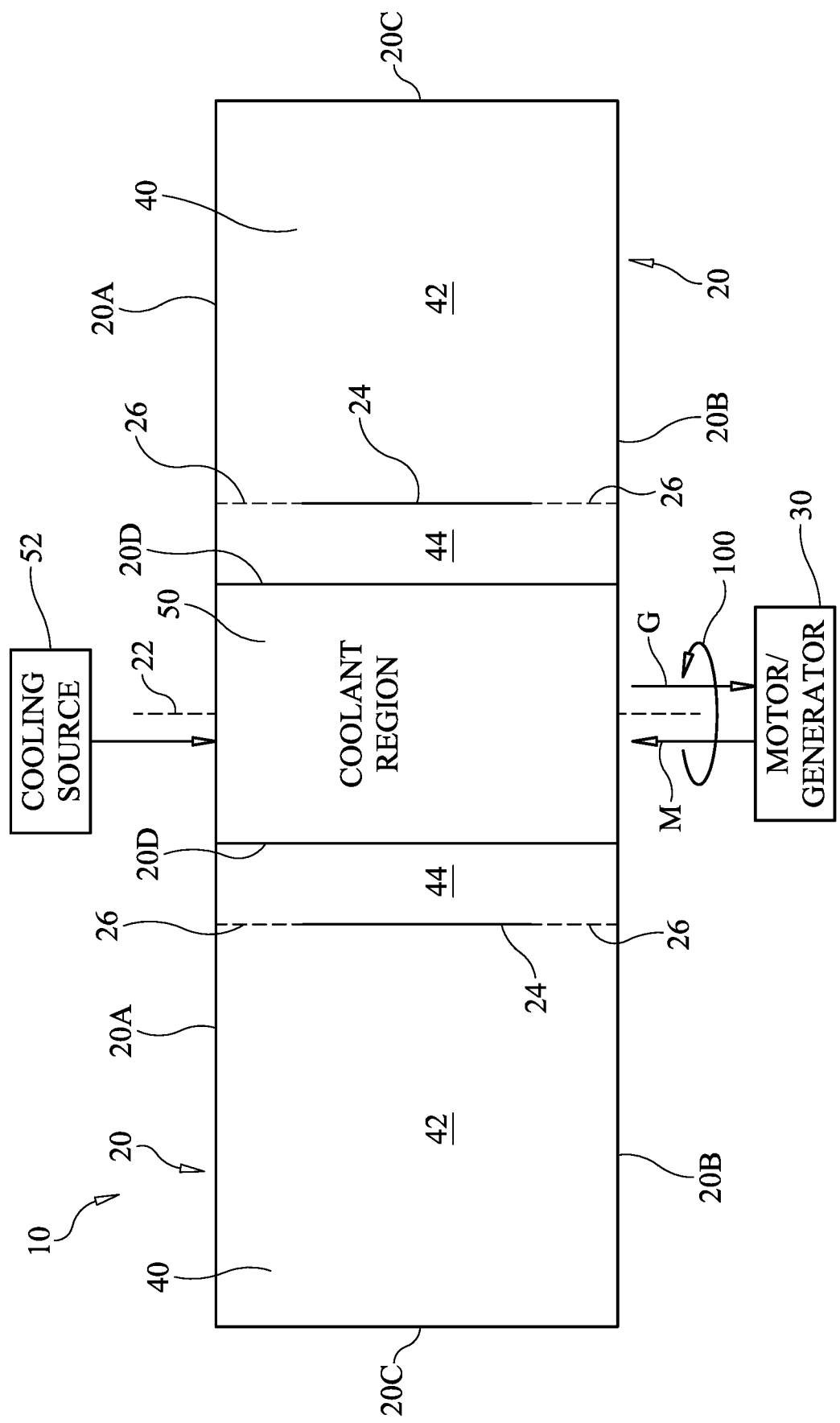
FIG. 1 is a schematic side view of a transfer-of-mass rotating engine in accordance with an embodiment of the present invention.

Referring now to the drawings and more particularly to FIG. 1, a transfer-of-mass rotating engine in accordance with an embodiment of the present invention is shown and is referenced generally by numeral 10. Engine 10 is illustrated without its working fluid used during operation thereof as this will be shown and described later herein. Engine 10 is illustrated schematically such that sizes of its features are not presented to scale.

Engine 10 includes a sealed donut-shaped wheel 20 and a motor/generator 30 configured for operation cyclically as a motor ("M") inputting rotational energy to wheel 20 and then as a generator ("G") receiving rotational energy from wheel 20 as will be explained further below. Such motors/generators are well-known in the art. Sealed wheel 20 is initially rotated about its central axis 22 by motor/generator 30 coupled to wheel 20 and configured for its motor phase "M" of operation causing wheel 20 to rotate about axis 22 as indicated by rotational arrow 100. The orientation of wheel 20 is not a limitation of the present invention. Wheel 20 has opposing side walls 20A/20B, an annular outer or end wall 20C, and an annular inner wall 20D. Walls 20A-20D are appropriately sealed at their various interfaces to thereby define an annular sealed region 40 within sealed wheel 20.

Disposed within annular sealed region 40 is an annular transfer-of-mass ("TOM" hereinafter) control wall 24 radially spaced from end wall 20C and inner wall 20D. The inclusion of TOM control wall 24 divides sealed region 40 into a first annular region 42 circumscribing a second annular region 44. Fluid communication between regions 42 and 44 is made possible by vents 26 in TOM control wall 24 at areas thereof adjacent to one or both of side walls 20A and 20B. Vents 26 can be passive or actively-controlled structures or devices without departing from the scope of the present invention.

The radial spacing between TOM control wall 24 and inner wall 20D is determined according to the planned final rate of rotation of wheel 20 when a working fluid's mass is transferred from annular region 42 to annular region 44 as will be explained further below. The radial position of TOM control wall 24 and the spacing between annular inner wall 20D and TOM control wall 24 largely determines the wheel's moment of inertia which, in turn, determines rotation rate and kinetic energy of the device as the working fluid's mass is transferred. As the transferred mass of the working fluid is positioned closer to the center of wheel 20, the moment of inertia is lowered while the rotation rate of wheel 20 is increased.

The central region of wheel 20 (i.e., disposed in the region bounded by annular inner wall 20D) defines a coolant region 50 of engine 10. In general, coolant region 50 defines a structure for introduction of a coolant material that lowers the temperature of annular region 44 at annular inner wall 20D. Typically, although not required, the structure of coolant region 50 supports the introduction and flow of a coolant against or adjacent to annular inner wall 20D as provided and controlled by a cooling source 52. For good thermal transfer through to region 44, annular inner wall 20D is generally made from a thermally conductive material. The configuration of coolant region 50 and coolant used thereby are not limitations of the present invention.

The general operating principles of the present invention are predicated on the Law of Conservation of Angular Momentum. The law states that a rotating object, such as a centrifuge or flywheel, has an intrinsic property A, such that:

$$A = I^* w$$

where A is angular momentum, I is moment of inertia, and w is angular velocity. Angular momentum A is of particular interest because the value is conserved. That is, once an object's rotation is established, its value must remain constant absent some external force. The moment of inertia I is determined by the distribution of mass within the rotating object. In accordance with the law, if mass is moved from the outer area of the rotating object towards its center, moment of inertia I decreases thereby requiring angular velocity w to increase in order to maintain conservation of angular momentum A. The increase in angular velocity w results in an increase in kinetic energy (KE) by the square of rotation, such that:

$$KE = (I^* w^2)/2$$

In order to move the mass of a rotating object towards its center, centrifugal forces must be overcome by introducing some form of work. As will be explained further below, one embodiment of the present invention uses heat to perform the work necessary to move a mass to the center of a rotating object. As mass moves inward, kinetic energy KE necessarily increases thereby converting the applied heat energy into mechanical energy.

Figure 2:
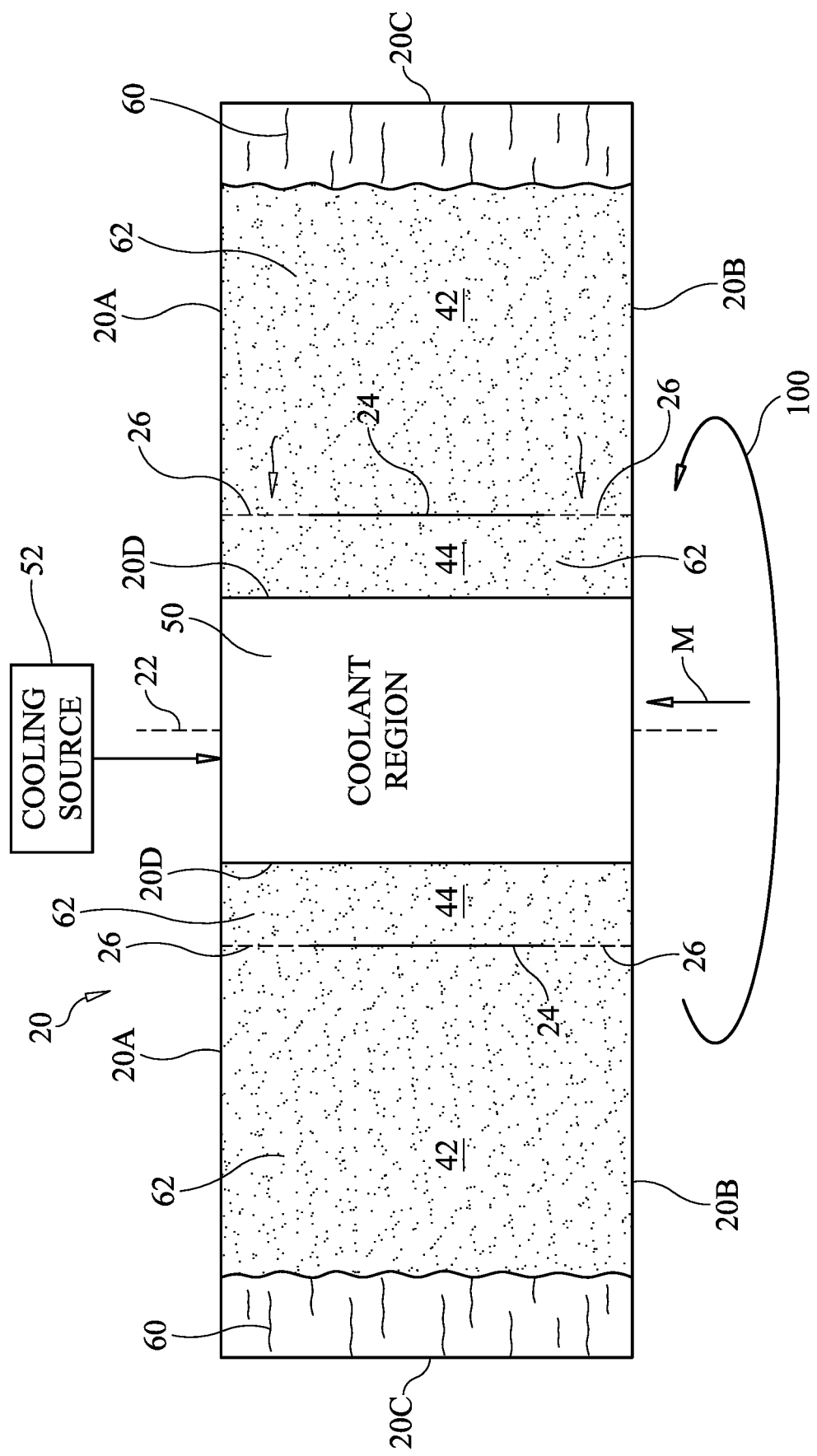
FIG. 2 is a schematic side view of the rotating engine's sealed wheel at the beginning of its rotating cycle in accordance with an embodiment of the present invention.
Figure 3:
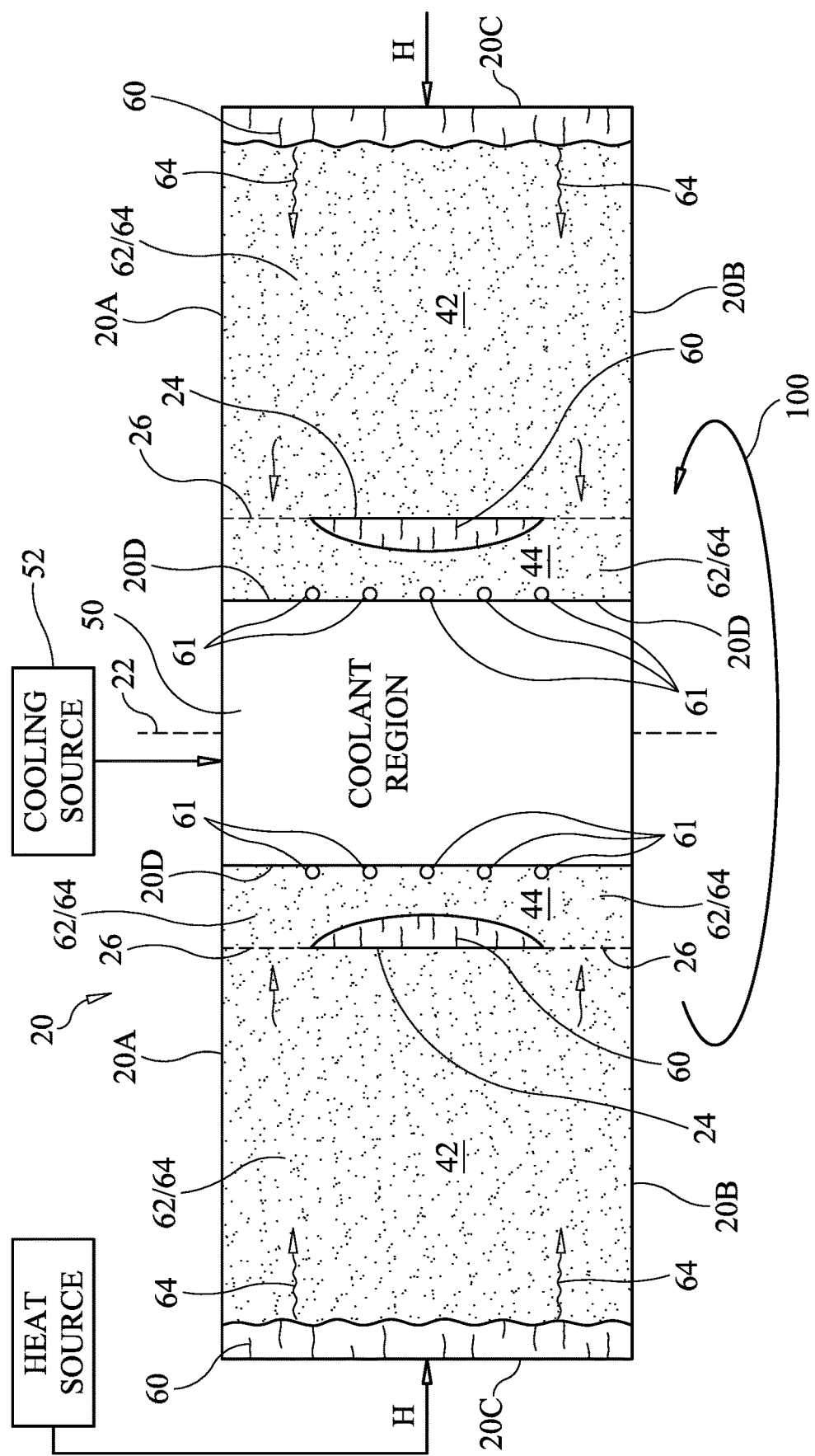
FIG. 3 is a schematic side view of the rotating engine's sealed wheel during the middle of its rotating cycle illustrating a transfer of mass in process in accordance with an embodiment of the present invention.
Figure 4:
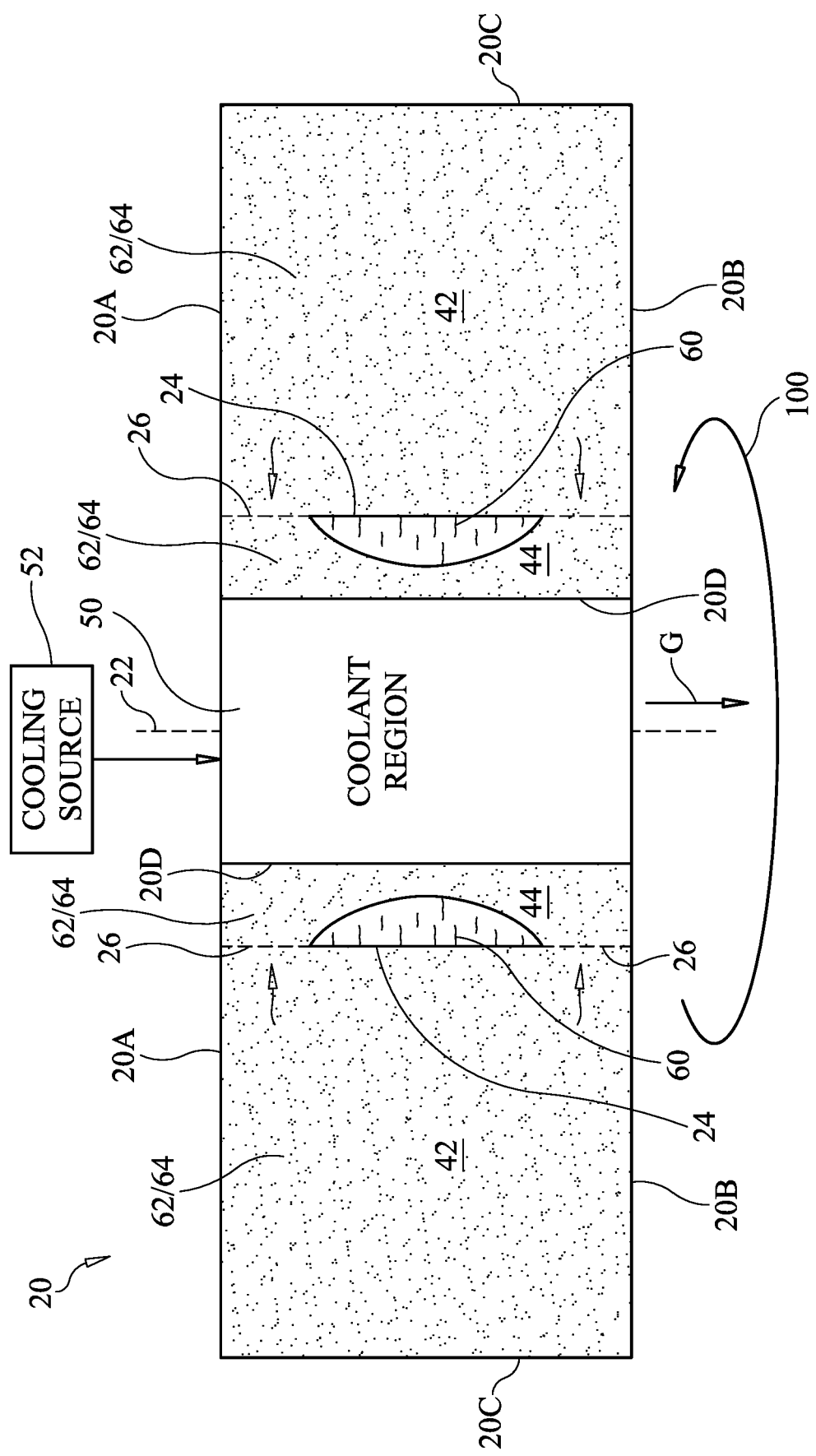
FIG. 4 is a schematic side view of the rotating engine's sealed wheel after its contained liquid has boiled off the wheel's annular end wall and has condensed at the wheel's annular inner wall.

An operational sequence for engine 10 will now be explained with reference to FIGS. 2-4 where motor/generator 30 has been omitted for clarity of illustration. Referring first to FIG. 2, sealed wheel 20 partially filled with its working fluid therein is illustrated in isolation at the beginning of its rotating cycle, i.e., rotation 100 of wheel 20 is brought about by the above-described motor/generator configured to operate in its motor phase M. Annular region 42 contains a liquid 60 and a vapor 62, while annular region 44 contains only vapor 62. In general, the density of liquid 60 is substantially greater than the density of vapor 62. As a result of this density difference, rotation 100 of wheel 20 causes the denser liquid 60 to move to annular end wall 20C of annular region 42 due to centrifugal forces. For purposes of this description, it will be assumed that liquid 60 is water and that vapor 62 is water vapor. However, other liquids/vapors can be used without departing from the scope of the present invention. Non-limiting examples include carbon dioxide, ammonia, and FREON.

As noted above, when sealed wheel 20 rotates as driven by motor phase M, centrifugal forces drive liquid 60 to the outside of wheel 20 where it collects adjacent to end wall 20C as illustrated. When the pre-determined target rotation rate of wheel 20 is reached, the motor stops inputting energy into wheel 20 to thereby conclude motor phase M where wheel 20 continues spinning in free rotation about its central axis 22 in what will be referred to herein as the free-spinning phase "F" illustrated in FIG. 3.

Once motor phase M is ended and free-spinning phase F commences, a heat source 32 applies heat "H" to end wall 20C (i.e., typically made from a thermally conductive material) in order to heat liquid 60 to a boiling state thereof whereby steam vapor 64 is generated at the interface between liquid 60 and vapor 62. Heat source 32 can be any provided or existing heat source without departing from the scope of the present invention. In some embodiments of the present invention, heat source 32 can be an existing heat source generating "free" heat energy for use by engine 10. Such heat sources include warm sea water, geothermal heat, and waste heat streams from existing industrial processes.

As liquid 60 boils, the volume occupied by vapors 62 and 64 expands rapidly and substantially in region 42. The expanding-volume vapor is driven through vents 26 and into region 44 where it comes into contact with the cooled inner wall 20D. The cooled vapor quickly condenses back to liquid as droplets 61 that collect as liquid 60 in region 44 at TOM control wall 24 owing to the centrifugal forces caused by rotation 100. The condensation occurring at annular inner wall 20D also lowers the pressure in region 44 to increase the movement of the heated vapor from region 42 into region 44. The movement of steam vapor 64 into region 44 effectively transfers the mass of liquid 60 into region 44 to thereby increase the angular velocity of wheel 20 and, therefore its kinetic energy in accordance with the law of conservation of angular momentum.

When all liquid 60 has boiled off at end wall 20C, free-spinning phase F concludes and the above-described motor/generator is configured to operate in its generator phase "G" in order to capture the increase in kinetic energy brought about by the transfer of mass of liquid 60 into region 44. This situation is illustrated in FIG. 4 where heat H is no longer applied to end wall 20C and liquid 60 is only present in annular region 44 following the condensing of heated vapor 62/64. More specifically, as the heated vapor 62/64 entering region 44 via vents 26 condenses back to liquid 60, the condensed liquid 60 is driven by centrifugal force up against TOM control wall 24 for retention in region 44.

Either of two events can trigger commencement of generator phase G. The first event occurs when all of liquid 60 in annular region 42 boils off and no further increase in kinetic energy is possible. The second event occurs when the maximum design rotation rate of wheel 20 is reached. In each event, the generator switches on and begins converting kinetic energy to electrical energy thereby slowing the rotation rate of wheel 20. The increased kinetic energy brought about by the transfer of mass of liquid 60 into region 44 is captured by the generator after slowing to a rate that corresponds approximately to the initial kinetic energy at the beginning of free-spinning phase F. In the first event where all the liquid is boiled, the generator remains on and the wheel is further slowed to a stop, thereby recapturing the energy that was input during motor phase M. In the second event, the generator switches off and free-spinning resumes as before such that boiling and mass transfer continue along with rate of rotation increase until one of the two events occurs again.

After all liquid 60 is transferred into annular region 44 and the increase in kinetic energy is captured by the motor/generator operating in generator phase G, wheel 20 slows/stops such that the condensed liquid 60 in region 44 is no longer held up against inner wall 20D. When this occurs, liquid 60 in region 44 is free to exit vents 26 and pass into region 42. The above-described process is repeated in a cyclic fashion beginning with initial spin-up in motor phase M.

The advantages of the present invention are numerous. The transfer-of-mass rotating engine eliminates the drawbacks associated with conventional rotating-blade turbine heat/steam engines. The simple spinning design of the illustrated embodiment uses transfer-of-mass within a sealed wheel to increase kinetic energy predicated on the Law of Conservation of Angular Momentum to avoid some drawbacks of turbines including requirements for high quality steam and pitting of turbine blades. The present invention's simple design has fewer components that will ultimately reduce general maintenance requirements. Additionally, while low-temperature heat engines produce low-pressure vapor with high specific volume that requires large diameter conduits and turbines for operation, the present invention's transfer-of-mass design operates with low-pressure vapor without requiring corresponding component size increases.

In some embodiments of the present invention, a second vapor having a density greater than vapor 62 but less than liquid 60 could be introduced into annular region 42. This second vapor would have thermodynamic properties allowing it to remain in the vapor state throughout the process such that vapor 62 would flow more quickly through the denser second vapor across annular region 42 (i.e., in the manner of a standard centrifuge separating substances based on relative density) and then continue to flow to inner wall 20D. In another example, the liquid could be boiled under high pressure in an external device/system and high-pressure vapor injected into a sealed, outer annular ring (not depicted) just prior to the spinning of the wheel. Valves could be used to control the release of steam into annular region 42 thereby virtually eliminating the time necessary to achieve boiling of the liquid within the wheel, resulting in shorter cycle times.

In some embodiments of the present invention, the internal air pressure in regions 42 and 44 can be controlled in order to enable evaporation at lower temperatures by a process known as "flash evaporation" that utilizes the heat content contained in the entirety of liquid to evaporate a portion of the liquid at low pressure. Briefly, prior to the start of the above-described motor phase M, the pressure in regions 42 and 44 is controlled to be at ambient pressure. Hot or warm water, either drawn from a natural source or heated externally, is added to region 42 and motor phase M is commenced forcing the liquid to annular end wall 20C as previously described. At the conclusion of motor phase M, the pressure in regions 42 and 44 is controlled such that the pressure of air at the surface of the liquid is lowered below the vapor pressure of the liquid in region 42. The low air pressure in region 42 lowers the boiling point of the liquid and causes it to boil in a process known as "flash evaporation". Utilizing the heat contained in the bulk liquid, a portion of the liquid in region 42 evaporates, to be condensed and captured in region 44 in the manner of other embodiments. Evaporation cools the remaining liquid in region 42 below the low-pressure boiling point until boiling stops. The percentage of water boiled is determined by the thermodynamic properties of the liquid, its temperature, and the extent to which vapor pressure is lowered.

In some embodiments of the present invention, high-pressure vapor could be injected into annular region 42 at uniform density throughout the region before motor phase M. In this way, after initial spin-up, the vapor density will remain relatively uniform throughout the annular region. In this embodiment, the pressure differential caused by reduced vapor volume in annular region 44 from condensation motivates the vapor to migrate from the annular end wall towards the center of the sealed wheel without the additional impetus of volume expansion from phase change from liquid to vapor. The difference in moment of inertia I between the uniform vapor at the start of spin-up and the collection of liquid in annular region 44 at the time of capture is enough to cause significant increase in the rate of wheel rotation and kinetic energy.

In other embodiments of the present invention, wheel 20 could be configured such that its inner wall 20D has an increased surface area to improve condensation of the heated vapor. For example, the axial length of wheel 20 could be greater at annular inner wall 20D than at annular end wall 20C. Additionally, other geometric designs could be employed along annular end wall 20C to provide greater surface area for heat transfer to the liquid. Also, heat can be applied along the sidewalls 20A and/or 20B to provide additional heat energy to the vapor as it climbs towards annular region 44. Also, radial vanes can be added in annular region 42 to hasten the initial spin-up of liquid 60, which otherwise depends on friction with the inner surfaces of annular region 42 to impart motion of the device to the liquid.

In other embodiments of the present invention, the wheel could function as an energy storage device by delaying initiation of generator phase G while the wheel is in free-spinning phase F until such time as output is needed. In still other embodiments of the present invention, a solid such as dry ice could be used in place of liquid 60.

Still further, the present invention could apply other types of energies or forces (e.g., magnetic, electric, kinetic, etc.) to the rotating sealed wheel to cause the above-described transfer of mass therein. For example, the force associated with an acceleration or deceleration of a vehicle in motion, such as cars, trucks, jets, elevators or even spacecraft, can be captured and converted to kinetic energy. Briefly, in these embodiments, rotation of a sealed wheel (or even just a simple sealed container) causes the liquid therein to assume a parabolic shape as the liquid is driven towards the annular outer wall of the rotating wheel/container. Then, acceleration/deceleration energy/force is applied to the liquid via the rotating wheel/container in a direction aligned with the axis of rotation of the wheel/container. The applied acceleration/deceleration energy/force flattens the liquid's parabolic shape to effectively drive the liquid from the annular outer wall of the wheel/container towards the central axis of rotation of the wheel/container to decrease the moment of inertia and thereby increase its rotational kinetic energy.

Although the invention has been described relative to specific embodiments thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. A transfer-of-mass system for increasing rotational energy output thereof, comprising:
    a sealed container having a central axis and an outer wall radially spaced apart from said central axis wherein said outer wall is thermally conductive, and wherein said sealed container comprises a wheel-shaped container having a thermally-conductive annular inner wall;
    a liquid partially filling said sealed container;
    a motor coupled to said sealed container for causing said sealed container to rotate about said central axis at a speed of rotation wherein said liquid is acted upon by centrifugal forces to move said liquid to said outer wall; and
    a source for applying energy to said liquid to cause at least a portion of said liquid at said outer wall to move towards said central axis of said sealed container wherein said sealed container rotates faster than said speed of rotation caused by said motor, wherein said source comprises a heat source for applying heat energy to said outer wall and a cooling source for cooling said annular inner wall.

2. A transfer-of-mass system as in claim 1, wherein said annular inner wall is radially spaced apart from said central axis.

3. A transfer-of-mass system as in claim 1, wherein said energy further comprises energy selected from the group consisting of an acceleration force, and a deceleration force.

4. A transfer-of-mass system for increasing rotational energy output thereof, comprising:
    a sealed container having a central axis and an outer wall radially spaced apart from said central axis;
    a liquid partially filling said sealed container;
    a motor coupled to said sealed container for causing said sealed container to rotate about said central axis at a speed of rotation wherein said liquid is acted upon by centrifugal forces to move said liquid to said outer wall; and
    a source for applying energy to said liquid to cause at least a portion of said liquid at said outer wall to move towards said central axis of said sealed container wherein said sealed container rotates faster than said speed of rotation caused by said motor,
    wherein said outer wall is thermally conductive, and wherein said sealed container comprises a wheel-shaped container having a thermally-conductive annular inner wall and a vented wall disposed radially between said outer wall and said annular inner wall.

5. A transfer-of-mass system as in claim 4, wherein said source comprises a heat source for applying heat energy to said outer wall, said system further comprising a cooling source for cooling said annular inner wall.

6. A transfer-of-mass system for increasing rotational energy output thereof, comprising:
    a sealed container having a central axis and an outer wall radially spaced apart from said central axis;
    a liquid partially filling said sealed container;
    a motor/generator coupled to said sealed container, said motor/generator having a motor phase of operation and a generator phase of operation wherein, in said motor phase of operation, said motor/generator causes said sealed container to rotate about said central axis at a first speed of rotation wherein said liquid is acted upon by centrifugal forces to move said liquid to said outer wall; and
    a source for applying energy to said liquid when said motor/generator is in said generator phase of operation, said energy causing at least a portion of said liquid at said outer wall to move towards said central axis of said sealed container wherein said sealed container rotates at a second speed of rotation that is faster than said first speed of rotation and wherein, in said generator phase of operation, said motor/generator is driven by said sealed container rotating at said second speed of rotation.

7. A transfer-of-mass system as in claim 6, wherein said sealed container comprises a wheel-shaped container having an annular inner wall radially spaced apart from said central axis.

8. A transfer-of-mass system as in claim 7, wherein said outer wall and said annular inner wall are thermally-conductive.

9. A transfer-of-mass system as in claim 6, wherein said energy is selected from the group consisting of heat energy, an acceleration force, and a deceleration force.

10. A transfer-of-mass system as in claim 6, wherein said source comprises a heat source wherein said energy comprises heat energy.

11. A transfer-of-mass system as in claim 6, wherein said outer wall is thermally conductive, wherein said sealed container comprises a wheel-shaped container having a thermally-conductive annular inner wall, and wherein said source comprises a heat source for applying heat energy to said outer wall, said system further comprising a cooling source for cooling said annular inner wall.

12. A transfer-of-mass system as in claim 6, wherein said outer wall is thermally conductive, and wherein said sealed container comprises a wheel-shaped container having a thermally-conductive annular inner wall and a vented wall disposed radially between said outer wall and said annular inner wall.

13. A transfer-of-mass system as in claim 12, wherein said source comprises a heat source for applying heat energy to said outer wall, said system further comprising a cooling source for cooling said annular inner wall.

14. A method for increasing rotational energy output of a rotating container, comprising the steps of:
    providing a sealed container partially filled with a liquid, said container having a central axis and an outer wall radially spaced apart from said central axis;
    rotating said container about said central axis at a first speed of rotation wherein centrifugal forces acting on said liquid cause said liquid to move towards said outer wall; and
    applying energy to said liquid wherein at least a portion of said liquid at said outer wall is transferred towards said central axis to cause said container to rotate about said central axis at a second speed of rotation that is greater than said first speed of rotation,
    wherein said outer wall is thermally conductive and wherein said sealed container comprises a wheel-shaped container having a thermally-conductive annular inner wall, and
    wherein said step of applying comprises the steps of applying heat energy to said outer wall wherein said liquid is converted to a vapor within said wheel-shaped container, and cooling said annular inner wall to condense said vapor thereat.

15. A method according to claim 14, wherein said energy is further comprises energy selected from the group consisting of an acceleration force, and a deceleration force.

* * * * *